United States Patent
Aubert et al.

(10) Patent No.: US 10,710,732 B2
(45) Date of Patent: Jul. 14, 2020

(54) ROTARY AIRCRAFT ICE PROTECTION SYSTEM

(71) Applicant: Bell Helicopter Textron Inc., Fort Worth, TX (US)

(72) Inventors: Roger J. Aubert, Arlington, TX (US); Jared M. Paulson, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 270 days.

(21) Appl. No.: 15/705,966

(22) Filed: Sep. 15, 2017

(65) Prior Publication Data
US 2019/0084682 A1    Mar. 21, 2019

(51) Int. Cl.
| | | |
|---|---|---|
| *B64D 15/14* | (2006.01) | |
| *B64D 15/12* | (2006.01) | |
| *B64D 15/22* | (2006.01) | |
| B64C 29/00 | (2006.01) | |

(52) U.S. Cl.
CPC ........... *B64D 15/14* (2013.01); *B64D 15/12* (2013.01); *B64D 15/22* (2013.01); *B64C 29/0033* (2013.01)

(58) Field of Classification Search
CPC ......... B64C 11/16; B64C 11/20; B64C 27/46; B64C 29/0091; B64C 29/0033; B63C 27/473; B64D 15/12; B64D 15/14; B64D 15/22
See application file for complete search history.

(56) References Cited

U.S. PATENT DOCUMENTS

| | | | | |
|---|---|---|---|---|
| 2,992,317 A | * | 7/1961 | Hoffman | B64D 15/12 219/202 |
| 3,183,975 A | * | 5/1965 | Keen | B64D 15/14 416/39 |
| 5,351,918 A | * | 10/1994 | Giamati | B64D 15/12 244/134 D |
| 5,686,003 A | | 11/1997 | Ingram et al. | |

(Continued)

FOREIGN PATENT DOCUMENTS

| | | | | |
|---|---|---|---|---|
| EP | 3456635 A1 | | 3/2019 | |
| FR | 2213871 A1 | | 8/1974 | |
| FR | 2213871 A1 | * | 8/1974 | B64C 27/46 |

OTHER PUBLICATIONS

EnglishTranslationFR-2213871A1.*
(Continued)

*Primary Examiner* — Assres H Woldemaryam
(74) *Attorney, Agent, or Firm* — Timmer Law Group, PLLC

(57) ABSTRACT

There is provided an ice protection system for a rotary aircraft, including a rotor blade susceptible to an ice buildup having an inboard portion and an outboard portion, the length of the inboard portion and the length of the outboard portion define a total length of the rotor blade; a first deicing system coupled to the inboard portion of the rotor blade, the first deicing system including a plurality of spanwise zones; and a second deicing system coupled to the outboard portion of the rotor blade, the second deicing system including a plurality of chordwise zones. In one aspect, there is provided a deicing system for a rotary aircraft. In another aspect, there is a method to de-ice a rotor blade of an aircraft.

17 Claims, 12 Drawing Sheets

(56) References Cited

U.S. PATENT DOCUMENTS

| | | | | |
|---|---|---|---|---|
| 5,947,418 | A * | 9/1999 | Bessiere | B64D 15/14 |
| | | | | 219/545 |
| 6,227,492 | B1 * | 5/2001 | Schellhase | B64D 15/12 |
| | | | | 244/134 D |
| 7,604,202 | B2 | 10/2009 | Froman et al. | |
| 8,550,402 | B2 * | 10/2013 | Houlihan | B64D 15/14 |
| | | | | 244/134 D |
| 8,969,765 | B2 | 3/2015 | Froman et al. | |
| 9,056,684 | B2 | 6/2015 | McCollough et al. | |
| 9,585,198 | B2 | 2/2017 | Modrzejewski et al. | |
| 9,771,158 | B2 * | 9/2017 | Gilmore | B64D 15/14 |
| 9,970,824 | B2 * | 5/2018 | Cheung | G01K 1/08 |
| 2006/0226292 | A1 * | 10/2006 | Houlihan | B64D 15/12 |
| | | | | 244/134 R |
| 2007/0257153 | A1 * | 11/2007 | Froman | B64C 29/0033 |
| | | | | 244/134 D |
| 2010/0065541 | A1 * | 3/2010 | Henze | B64D 15/12 |
| | | | | 219/202 |
| 2012/0256053 | A1 | 10/2012 | McCollough et al. | |
| 2013/0013116 | A1 | 1/2013 | Mancuso | |
| 2013/0189098 | A1 | 7/2013 | Covington et al. | |
| 2013/0228654 | A1 | 9/2013 | Aubert et al. | |
| 2014/0076882 | A1 * | 3/2014 | Houlihan | B64D 15/14 |
| | | | | 219/486 |
| 2014/0116652 | A1 | 5/2014 | Ehinger et al. | |
| 2015/0063414 | A1 * | 3/2015 | Wigen | G01K 13/028 |
| | | | | 374/138 |
| 2015/0093244 | A1 * | 4/2015 | Wigen | G01K 13/028 |
| | | | | 416/61 |
| 2015/0114945 | A1 | 4/2015 | Miller et al. | |
| 2017/0145919 | A1 | 5/2017 | Aubert | |

OTHER PUBLICATIONS

European Search Report, dated Jan. 2, 2019, by the EPO, re EP Patent App No. 18194354.9.

European Exam Report, dated Jan. 25, 2019, by the EPO, re EP Patent App No. 18194354.9.

Innovative Dynamics, Inc.; Deicing Systems; http://www.idiny.com/deicing.html; Sep. 5, 2017.

National Technical Information Service; U.S. Dept of Commerce; The Development of an Advanced Anti-Icing/Deicing Capability for U.S. Army Helicopters; vol. 1; Design Criteria and Technology Considerations; J.B. Werner; Nov. 1975.

EP Examination Report, dated Sep. 11, 2019, by the EPO, re EP Application No. 18194354.9.

EP Communication under Rule 71(3) EPC—Intention to Grant, dated Mar. 20, 2020, by the EPO, re EP Application No. 18194354.9.

* cited by examiner

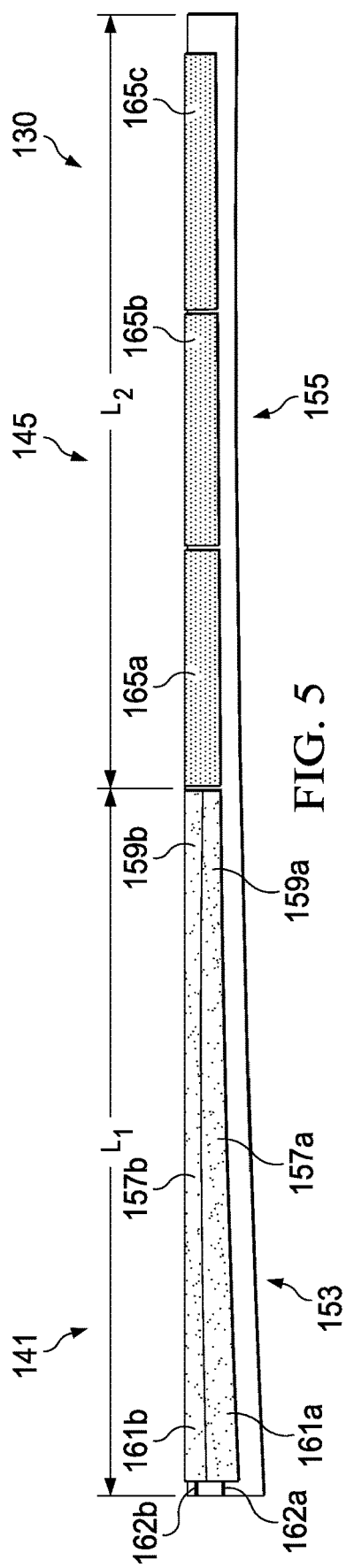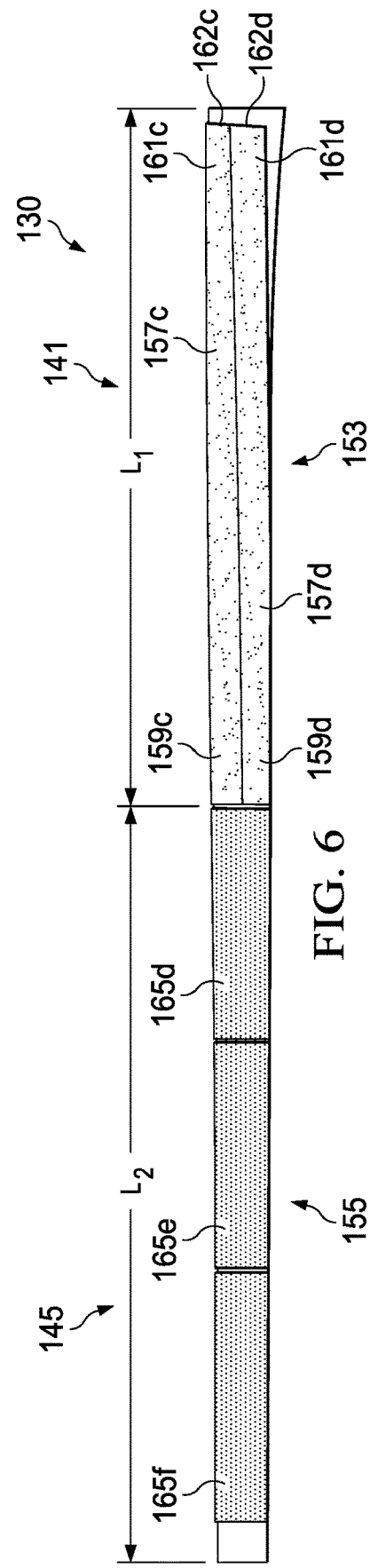

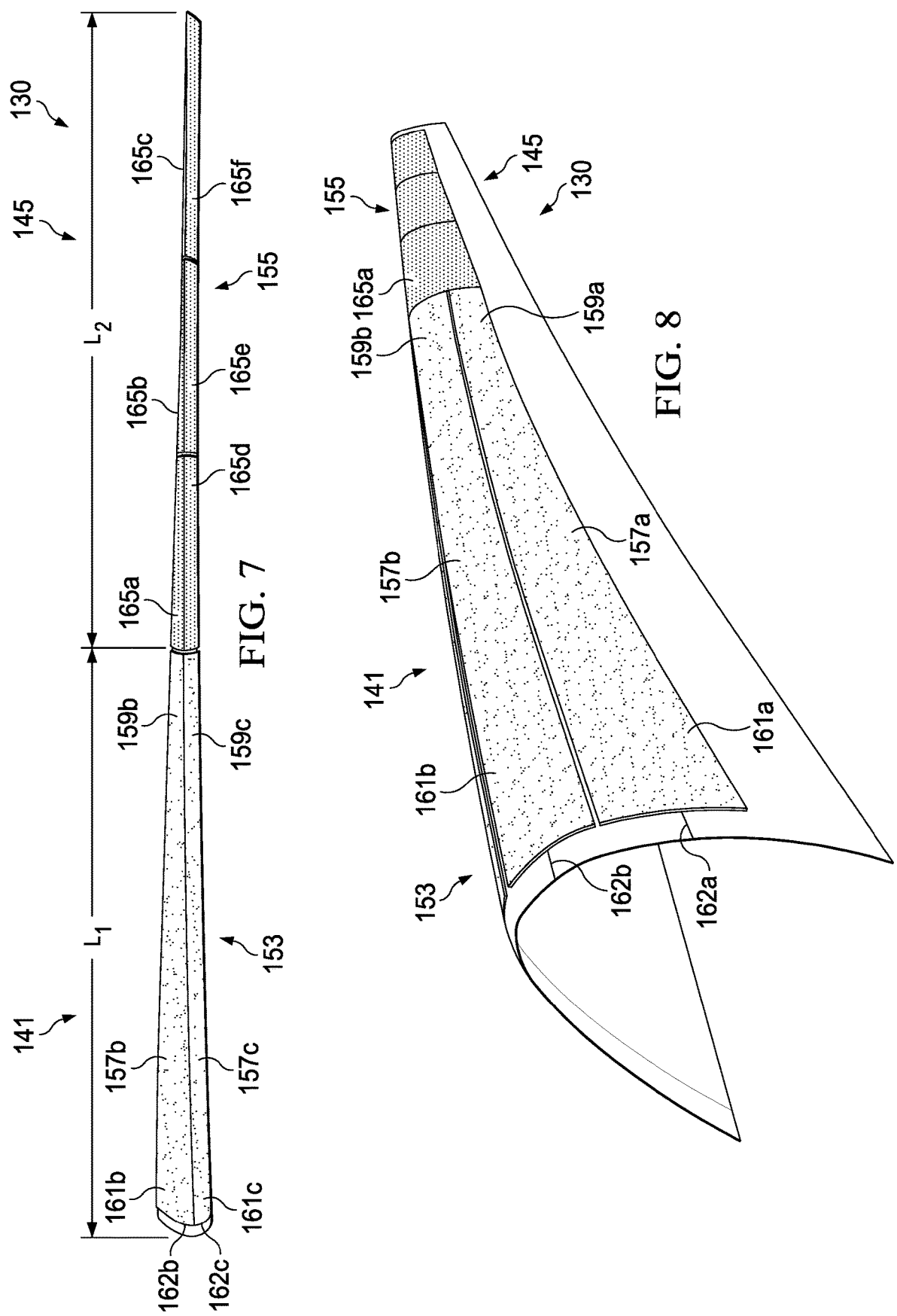

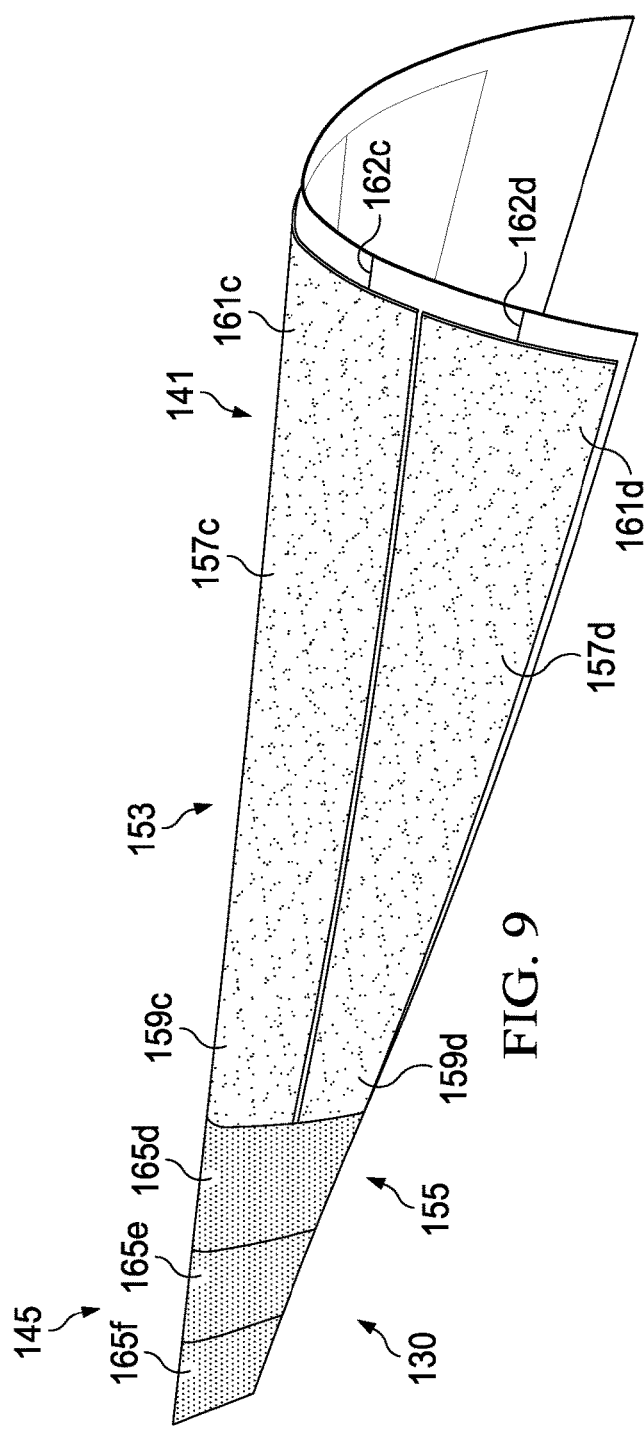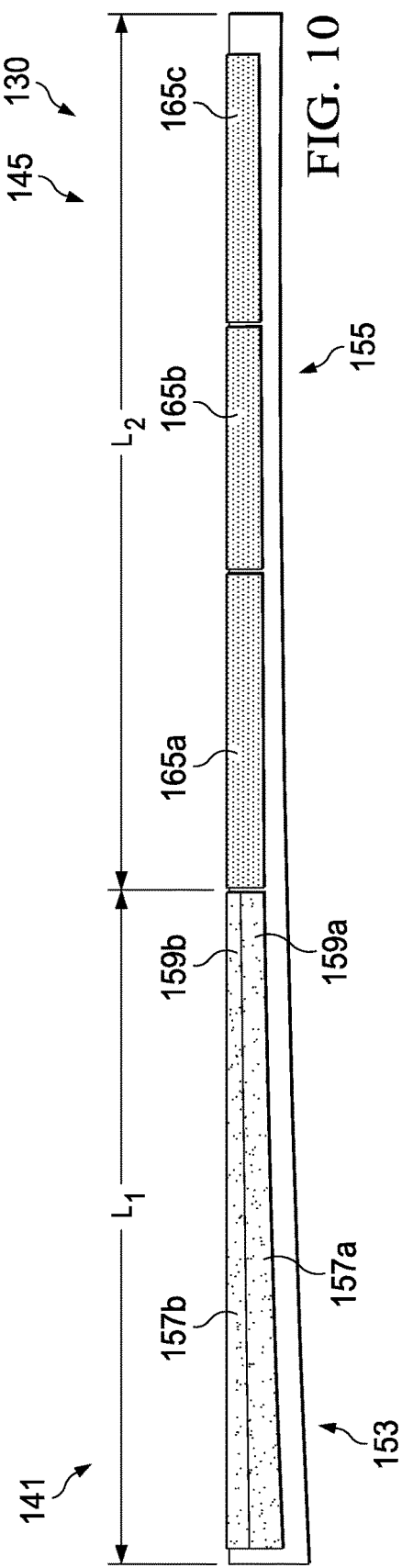

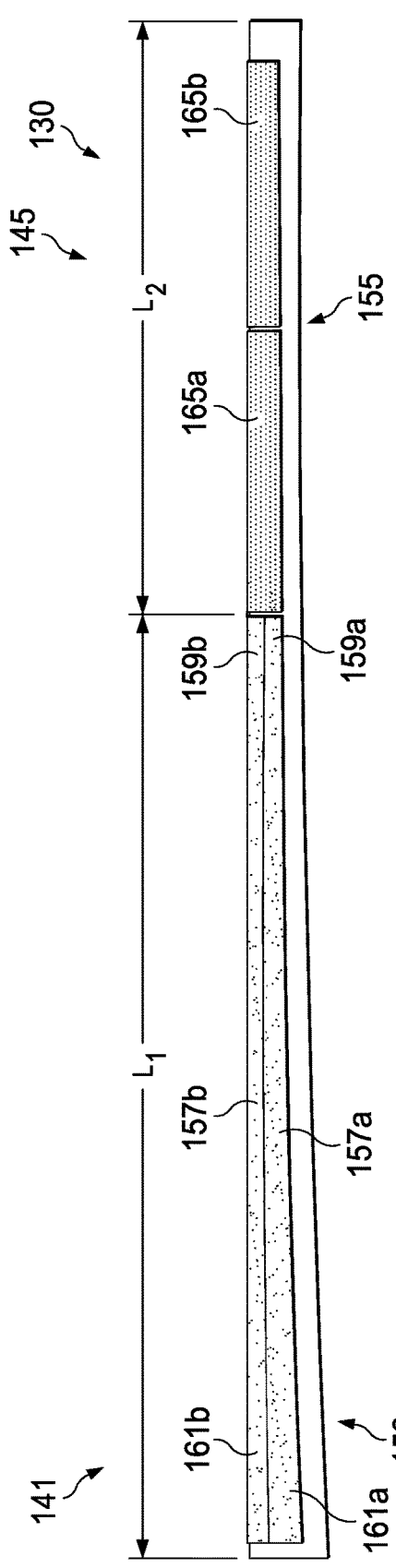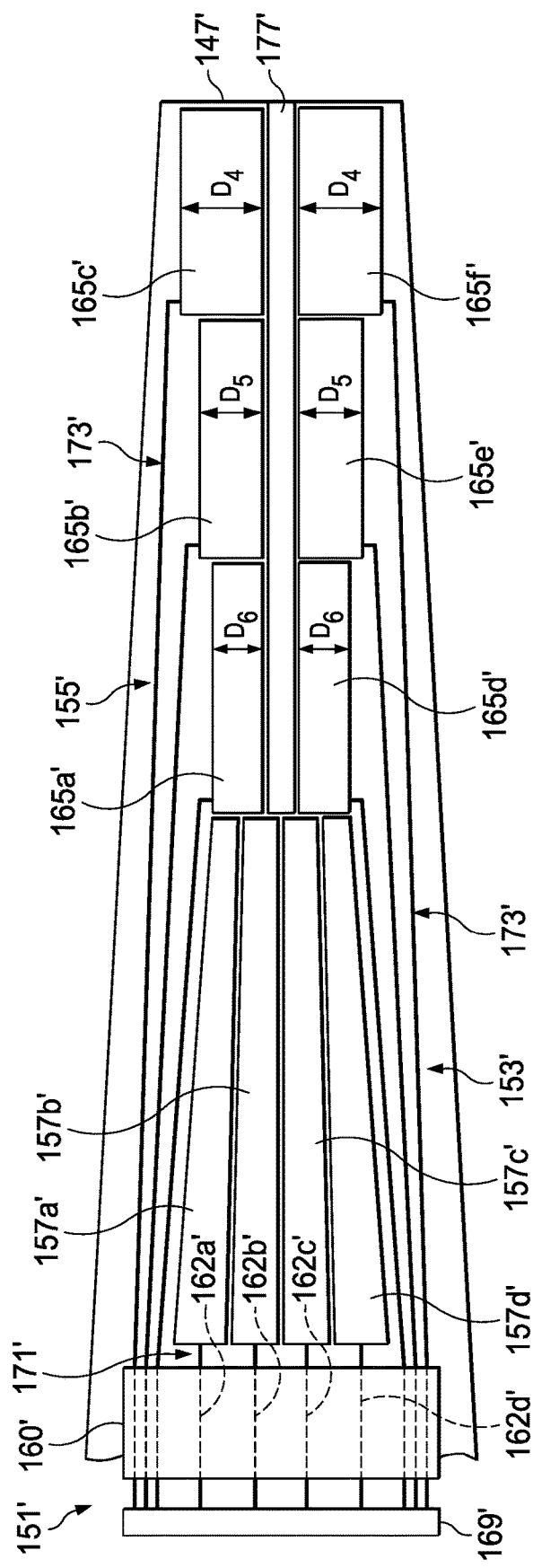
FIG. 11
FIG. 12

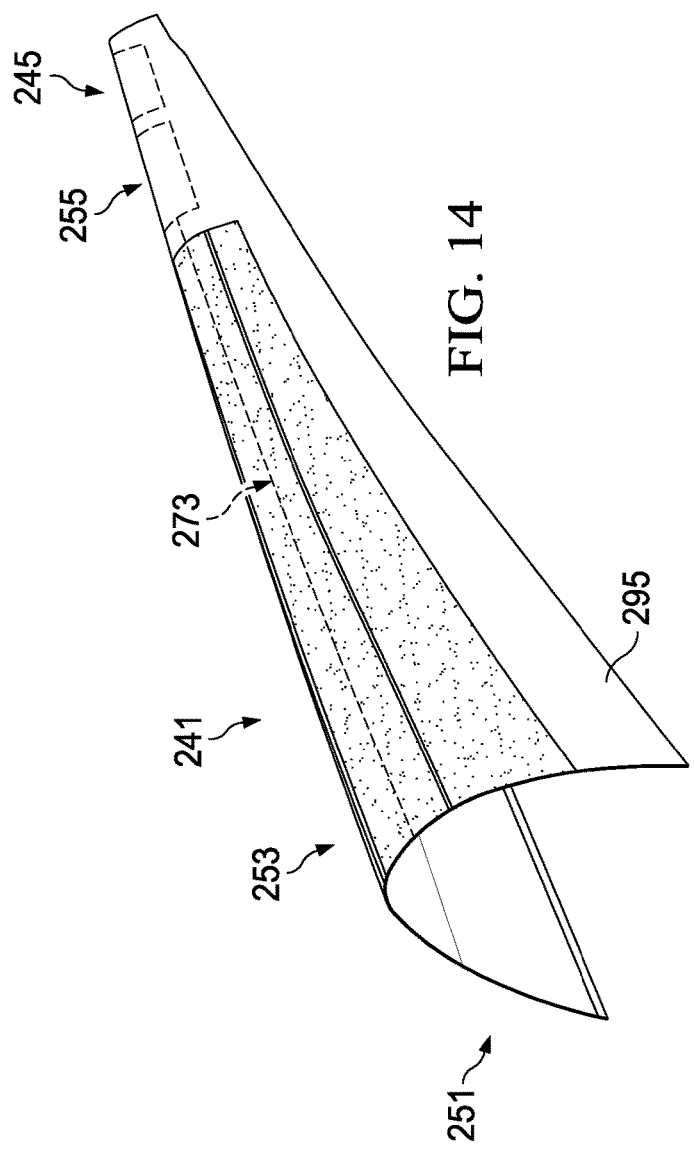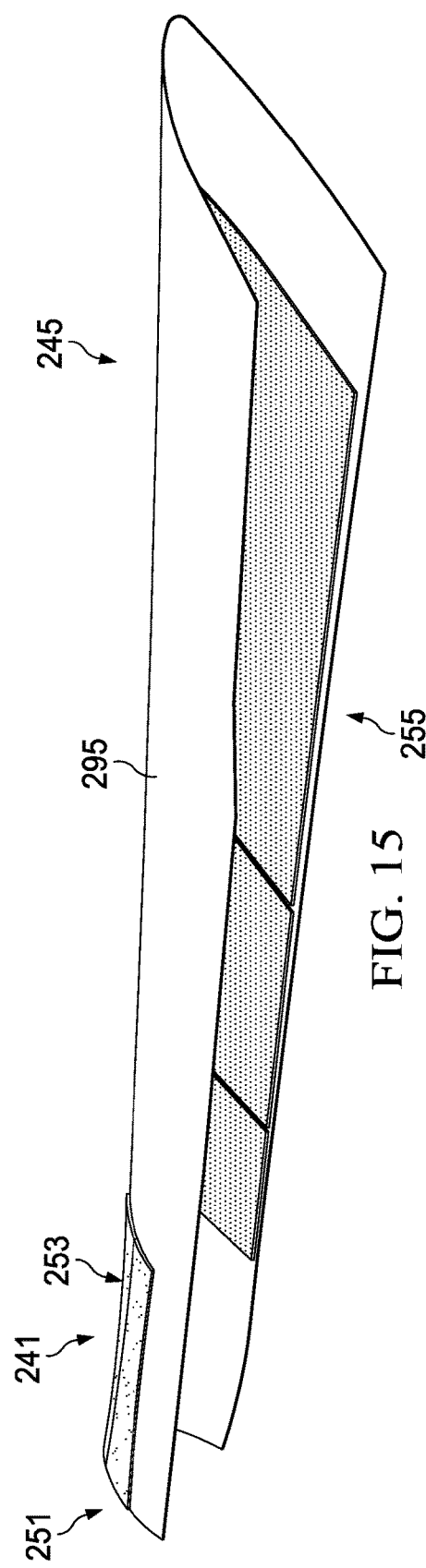

ROTARY AIRCRAFT ICE PROTECTION SYSTEM

BACKGROUND

Technical Field

The present disclosure relates to ice protection systems, and more particularly, to an ice protection system for rotary aircraft, such as a tiltrotor aircraft.

Description of Related Art

Vertical takeoff and landing aircraft ("VTOL") can have ice-buildup that can negatively impact performance and cause catastrophic failure. One example of a VTOL aircraft is a tiltrotor. A tiltrotor aircraft may operate in a helicopter mode by positioning the nacelles upright, a transition mode by tilting the nacelles, and in an airplane mode by positioning the nacelles forward. Each propulsion system within a nacelle includes at least a proprotor, a gearbox, and a power source. The proprotor has a plurality of rotor blades that must operate over a wide range of speeds and angles in a variety of atmospheric conditions.

Tiltrotor aircraft have ice-buildup vulnerabilities that do not exist on either propeller-driven, fixed-wing aircraft, or conventional helicopters. Compared to propellers, the proprotor of a tiltrotor are significantly larger in diameter and rotate more slowly, creating lower centrifugal forces. Higher centrifugal forces tend to cause ice that forms on the blades of a propeller to shed, whereas the lower forces of the proprotor may allow for more ice buildup on the blades. Also, lift for a tiltrotor is generated by proprotors having a smaller diameter than the rotor assembly on a conventional helicopter, so proprotors need to be more efficient at producing lift. Ice accumulation greatly reduces proprotor lift efficiency, and, because of the proprotor diameter and aircraft weight ratio, tiltrotors are significantly affected in their ability to land or hover by ice accumulation on the blades of the proprotor.

Prior methods of rotor blade ice protection systems on helicopters have included a configuration of several adjacent electrically heated zones that run in the spanwise direction down the full length of the blade. Power is applied to these zones by electrical connections at the root end of the blade. The spanwise zone configuration suitable for helicopter rotor blades has not been implemented in tiltrotor aircraft rotor blades due to the concern with shedding large chunks of ice in airplane and transition modes. In the airplane mode, the tip path plane of the rotor blades is located out to the sides of and perpendicular to the tiltrotor fuselage. If large chunks of ice are shed during airplane and transition modes, large chunks of ice could hit and damage the tiltrotor fuselage. This is not a concern for helicopter ice protection systems because the rotor blades are directly above the aircraft and the high centrifugal force on the blades sheds ice clear of the fuselage.

Prior configurations of rotor blade ice protection systems for a tiltrotor aircraft have included several electrically heated zones that run in the chordwise direction around the leading edge of the blade split by a leading edge anti-icing parting strip 12, as shown in FIG. 3. Multiple chordwise heating zones 13, 15 are located adjacent to one another down the span of the rotor blade 11. The chordwise heating zones 13, 15 require a great number of electrical connections 17 due to the large number of smaller heated zones designed as such in order to reduce the size of potential ice chunks that are shed from the blades.

Electrical connections are notoriously weak points in a tiltrotor rotor blade, which is subjected to higher dynamic motion and bending and higher strain levels as compared to a conventional helicopter blade. Another disadvantage to the chordwise zone configuration is the need to provide power to chordwise zones that are located outboard on the blade because it drives electrical bus bars to be routed aft of the heating zones down the span of the blade. In this design, the bus bars are exposed to some of the highest strains on the blade which limits the options for material and design for the elements that perform this function. In the case where an anti-ice parting strip is required at the leading edge of the blade, the chordwise zones must be split at the leading edge in order to avoid overlapping de-ice and anti-ice elements. This drives a need for crossover wires to be routed underneath the parting strip in order to connect the upper and lower surface chordwise zones. There is typically at least one crossover wire for each chordwise zone and it is in these areas that there is an increased risk of shorting the anti-ice heating elements to the de-ice crossover wires. In addition, internal structure of the leading edge of a rotor blade is very space-constrained and the great number of electrical connection can make it difficult to meet thickness requirements, which can result in high spots, resistance issues, and shorts within the rotor blade structure.

The prior configurations of rotor blade ice protection systems for a tiltrotor aircraft described above can result in a product that has poor reliability and is difficult to manufacture consistently with high quality.

There is a need for an improved ice protection system for a rotary aircraft.

SUMMARY

In a first aspect, there is provided an ice protection system for a rotary aircraft, including a rotor blade susceptible to an ice buildup having an inboard portion and an outboard portion, the length of the inboard portion and the length of the outboard portion define a total length of the rotor blade; a first deicing system coupled to the inboard portion of the rotor blade, the first deicing system including a plurality of spanwise zones; and a second deicing system coupled to the outboard portion of the rotor blade, the second deicing system including a plurality of chordwise zones.

In an embodiment, the length of the inboard portion of the rotor blade is from about 40% to about 60% of the total length of the rotor blade.

In another embodiment, the rotor blade includes an abrasion strip disposed on a leading edge thereof, at least one of the first deicing system and the second deicing system is disposed at least partially below the abrasion strip.

In still another embodiment, the first deicing system is disposed on the abrasion strip.

In yet another embodiment, the second deicing system is disposed at least partially below the abrasion strip.

In an embodiment, the rotor blade is for a tiltrotor aircraft.

In one embodiment, the ice protection system further includes an anti-ice zone in the outboard portion.

In another embodiment, at least one of the first and second deicing systems and the anti-ice zone are sensorless.

In an exemplary embodiment, the ice protection further includes a controller for selectively controlling the operation of the first deicing system and the second deicing system.

In one embodiment, the controller is configured to operate according to a duty cycle.

In yet another embodiment, the first deicing system is coupled only to the inboard portion of the rotor blade and the second deicing system is coupled only to the outboard portion of the rotor blade.

In an embodiment, the plurality of chordwise zones includes a first chordwise zone adjacent to a tip of the rotor blade and a second chordwise zone inboard of the first chordwise zone; wherein the depth of the first chordwise zone is more than the depth of the second chordwise zone.

In a second aspect, there is a deicing system for a rotary aircraft, including a plurality of spanwise zones configured to be coupled to an inboard portion of a rotor blade; wherein the inboard portion of the rotor blade is from about 40% to about 60% of the total length of the rotor blade.

In an embodiment, each of the spanwise zones has a generally trapezoidal shape.

In a third aspect, there is a method to de-ice a rotor blade of an aircraft, including providing a rotor blade susceptible to an ice buildup having an inboard portion and an outboard portion, providing a first deicing system coupled only to the inboard portion of the rotor blade, the first deicing system including a plurality of spanwise zones; providing a second deicing system coupled only to the outboard portion of the rotor blade, the second deicing system including a plurality of chordwise zones; operating the first deicing system to heat the inboard portion of the rotor blade; and operating the second deicing system to heat the outboard portion of the rotor blade.

In an embodiment, the step of operating the second deicing system is performed before the operating the first deicing system step.

In one embodiment, the first deicing system is coupled only to the inboard portion of the rotor blade and the second deicing system is coupled only to the outboard portion of the rotor blade.

In another embodiment, the method includes sensing an air temperature near a fuselage of the aircraft and a velocity of air passing over the fuselage of the aircraft; and selectively controlling the operation of the first deicing system and the second deicing system.

In yet another embodiment, the controlling the operation step further includes selecting a duty cycle.

In an embodiment, the duty cycle is defined by a pattern of time intervals in which electrical power is supplied or not supplied to the first deicing system and the second deicing system for the duration of each time interval within the pattern, the selection of the duty cycle being at least partially in response to the sensed air temperature near the fuselage and the velocity of air passing over the fuselage of the aircraft.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 5 is a top view of a rotor blade including an ice protection system, according to one exemplary embodiment;

FIG. 6 is a bottom view of the rotor blade in FIG. 5;

FIG. 7 is a front view of the leading edge of the rotor blade in FIG. 5;

FIGS. 8-9 are partial isometric views of a leading edge portion of the rotor blade in FIG. 5;

FIGS. 10-11 are top views of ice protection systems on rotor blades, according to exemplary embodiments;

FIG. 12 is a partial, broken away, unfolded top view about the leading edge axis of a rotor blade including an ice protection system with an anti-ice zone, according to an exemplary embodiment;

FIGS. 14-15 are isometric views of a rotor blade according to an exemplary embodiment.

DESCRIPTION OF THE PREFERRED EMBODIMENT

Illustrative embodiments of ice protection systems and methods of operation therefor are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The embodiments of the ice protection systems and methods therefor will be described with reference to a blade on a VTOL aircraft, such as tiltrotor aircraft 101 shown in FIGS. 1-2, it will be appreciated that the ice protection system and methods therefor may be used on other rotary aircraft, including helicopters, tilt wing aircrafts, quad tiltrotor aircraft, unmanned aerial vehicles (UAVs), and other vertical lift or VTOL aircrafts, or can further be used with any device configured with a rotor blade and/or airfoil susceptible to an ice buildup, including fixed wing aircraft, turbine blades, devices with propellers, windmills, and wind turbines. Further, any features of one embodiment of the ice protection systems and methods therefor in this disclosure can be used with any other embodiment in this disclosure such that the other embodiment has the same or similar features, operates in the same or similar way, or achieves the same or similar functions.

Figure 1:
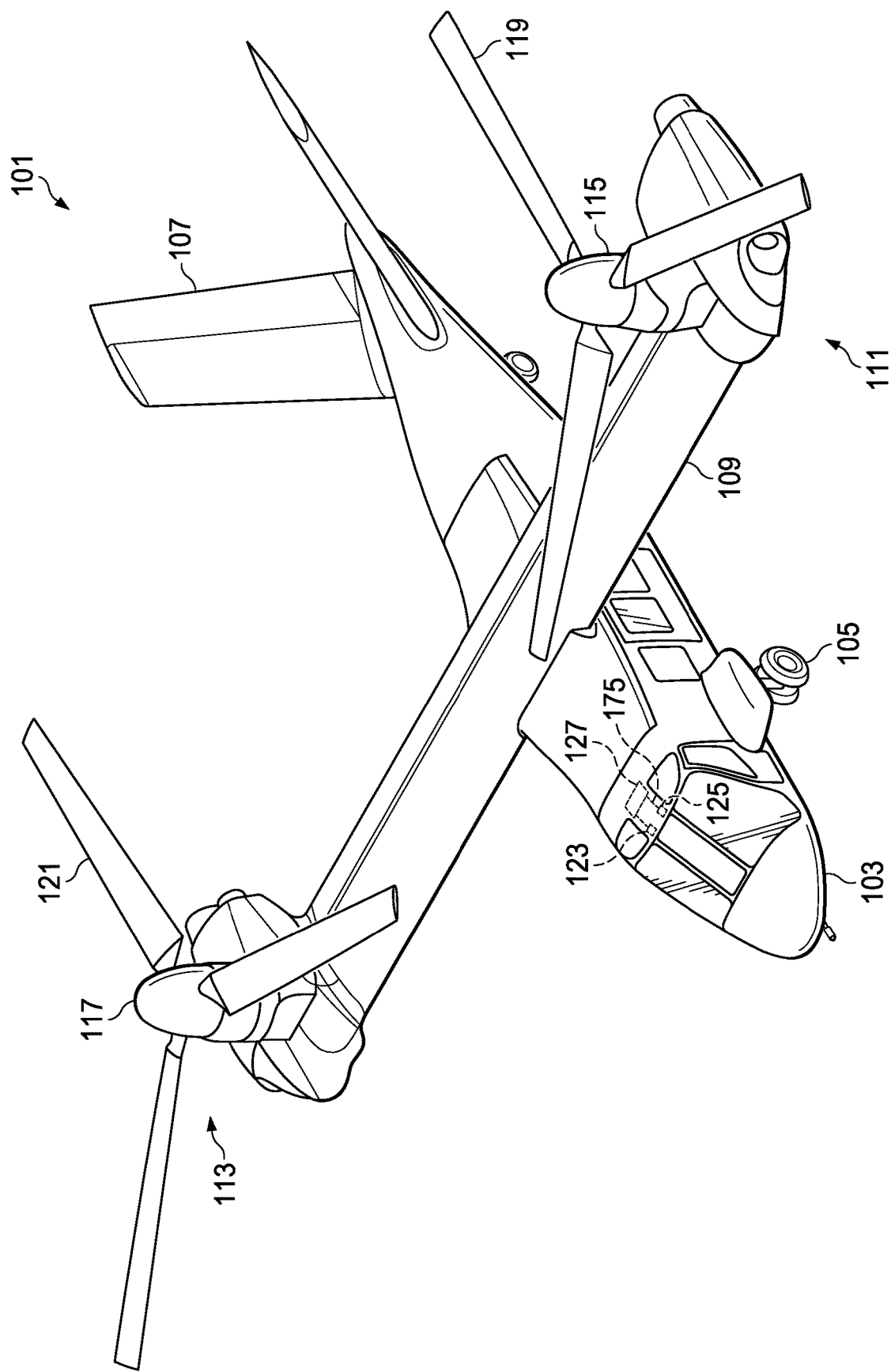
FIG. 1 is a perspective view of a tiltrotor aircraft in helicopter mode, according to one example embodiment.
Figure 2:
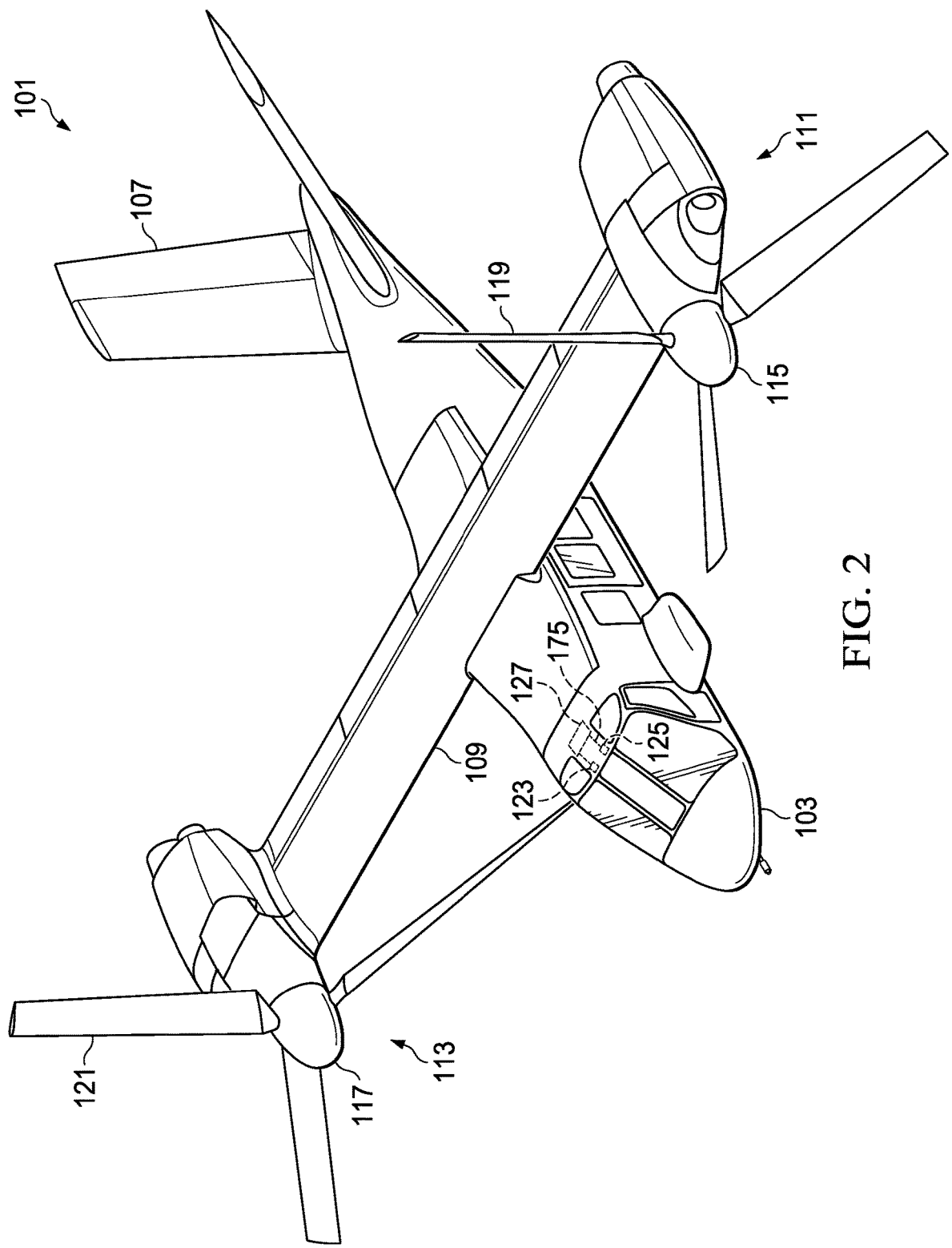
FIG. 2 is a perspective view of a tiltrotor aircraft in airplane mode, according to one example embodiment.

Referring to FIGS. 1-2, tiltrotor aircraft 101 is illustrated. Tiltrotor aircraft 101 can include a fuselage 103, a landing gear 105, a tail member 107, a wing 109, a propulsion system 111, and a propulsion system 113. Each propulsion system 111, 113 includes a fixed engine and a rotatable proprotor 115, 117, respectively. Each rotatable proprotor 115, 117 has a plurality of rotor blades 119, 121, respectively, associated therewith. The position of proprotors 115, 117, as well as the pitch of rotor blades 119, 121, can be selectively controlled in order to selectively control direction, thrust, and lift of tiltrotor aircraft 101.

FIG. 1 illustrates tiltrotor aircraft 101 in helicopter mode, in which proprotors 115 and 117 are positioned substantially vertical to provide a lifting thrust. FIG. 2 illustrates tiltrotor aircraft 101 in an airplane mode, in which proprotors 115, 117 are positioned substantially horizontal to provide a forward thrust in which a lifting force is supplied by wing 109. It should be appreciated that tiltrotor aircraft can be operated such that proprotors 115, 117 are selectively positioned between airplane mode and helicopter mode, which can be referred to as a conversion mode.

The fuselage 103 includes a sensor 123 for sensing outside air temperature (OAT) and a sensor 125 for sensing the speed of the air passing over the fuselage 103 and are in electrical communication with a controller 127.

Figure 4A:
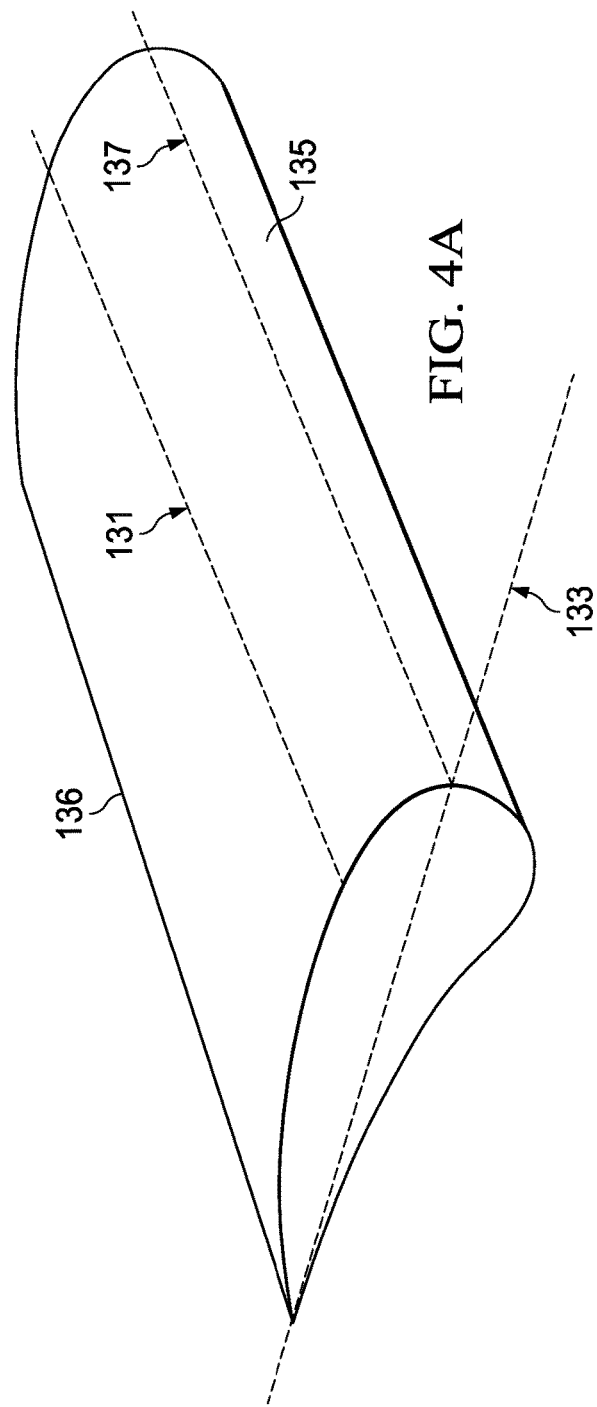
FIG. 4A is a partial perspective view of a rotor blade, according to an exemplary embodiment.
Figure 4B:
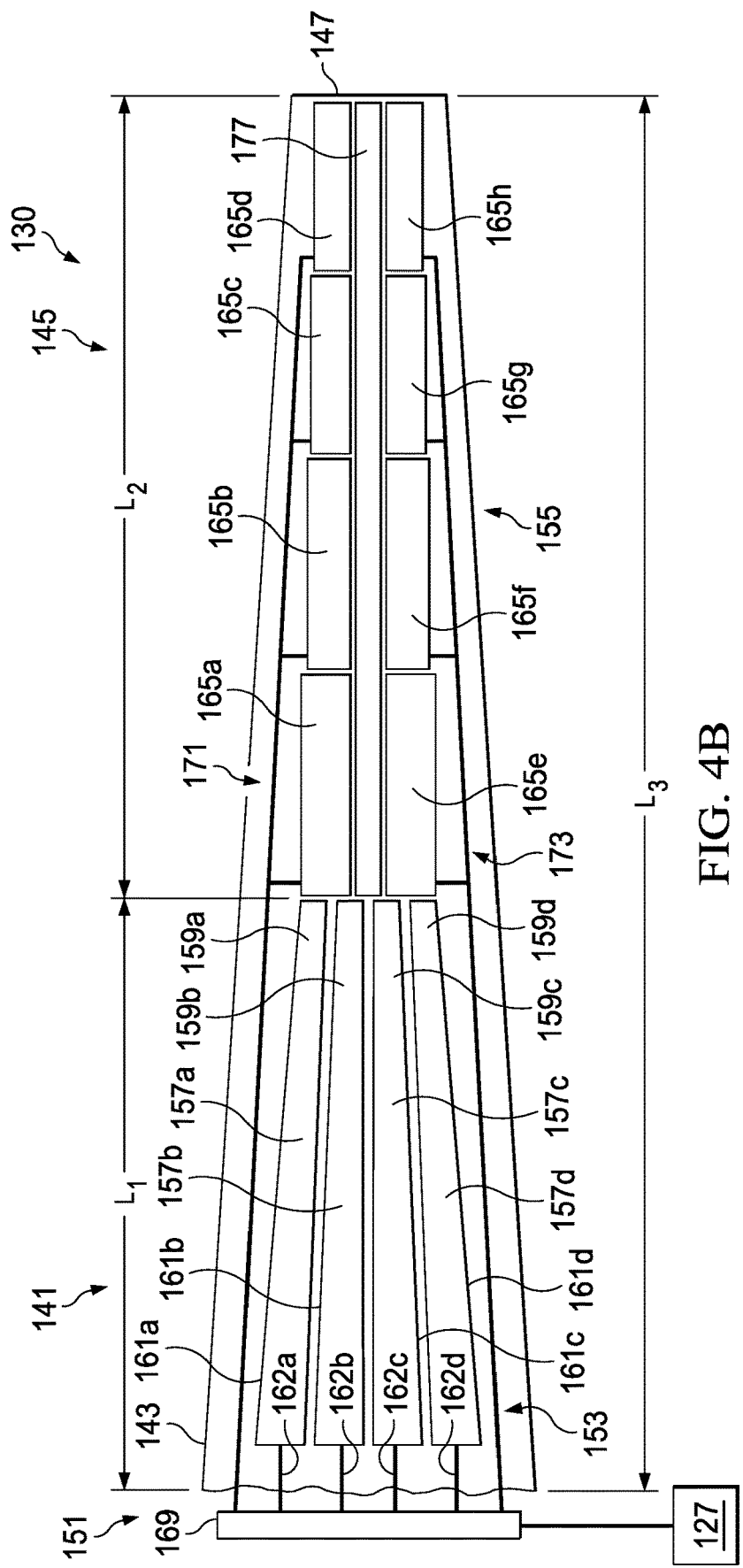
FIG. 4B is a partial, broken away, unfolded, top view about the leading edge axis of a rotor blade including an ice protection system with an anti-ice zone, according to an exemplary embodiment.

FIG. 4A is a partial, perspective view of an exemplary rotor blade 130 (e.g., a rotor blade 119, 121) that is susceptible to an ice buildup. Rotor blade 130 includes a spanwise axis 131, a chordwise axis 133, a leading edge 135, a leading edge axis 137, and a trailing edge 136. FIGS. 4B-15 illustrate exemplary and non-limiting embodiments of rotor blade 130. FIG. 4B shows rotor blade 130 unfolded about the leading edge axis 137. Rotor blade 130 includes an inboard portion 141 adjacent to the root end 143 and an outboard portion 145 adjacent to the tip end 147. The length $L_1$ of the inboard portion 141 and the length $L_2$ of the outboard portion 145 define a total length $L_3$ of the rotor blade 130. The total length $L_3$ of the rotor blade 130 is the span length from the root end 143 to the tip end 147.

Ice protection systems and methods therefor that are effective in protecting against ice accumulation, reliable, and rugged are described herein. An embodiment of the ice protection system 151 for a rotary aircraft is shown in FIGS. 4B-11. The ice protection system 151 includes a first deicing system 153 coupled to the inboard portion 141 and a second deicing system 155 coupled to the outboard portion 145. The first and second deicing systems 153, 155 are disposed on, near, and/or adjacent to the leading edge 135 of the rotor blade 130. The first deicing system 153 is inboard of and adjacent to the second deicing system 155 on the rotor blade 130.

In an embodiment, the first deicing system 153 is coupled only to the inboard portion 141 of the rotor blade 130 and the second deicing system 155 is coupled only to the outboard portion 155 of the rotor blade 130.

In an embodiment, length $L_1$ of the inboard portion 141 can be from about 40% to about 60% of the total length $L_3$ of the rotor blade 130 (e.g., $L_1$ can be 40%, 41%, 42%, 43%, 44%, 45%, 46%, 47%, 48%, 50%, 51%, 52%, 53%, 54%, 55%, 56%, 57%, 58%, 59%, or 60% of the total length $L_3$ of the rotor blade 130). Length $L_2$ of the outboard portion 145 can be from about 40% to about 60% of the total length $L_3$ of the rotor blade 130 (e.g., $L_2$ can be 40%, 41%, 42%, 43%, 44%, 45%, 46%, 47%, 48%, 50%, 51%, 52%, 53%, 54%, 55%, 56%, 57%, 58%, 59%, or 60% of the total length $L_3$ of the rotor blade 130). For example, but not limitation, as shown in FIG. 4B, the inboard portion 141 has a length $L_1$ that represents about 43% of the total length $L_3$ and the outboard portion 145 has a length $L_2$ that represents about 57% of the total length $L_3$. In an exemplary embodiment illustrated in FIGS. 5-7, the inboard portion 141 has a length $L_1$ is 47% of the total length $L_3$ and the outboard portion 145 has a length $L_2$ that is about 53% of the total length $L_3$. In another exemplary embodiment shown in FIG. 10, the inboard portion 141 has a length $L_1$ that represents about 40% of the total length $L_3$ and the outboard portion 145 has a length $L_2$ that represents about 60% of the total length $L_3$. In still another exemplary embodiment shown in FIG. 11, the inboard portion 141 has a length $L_1$ that represents about 60% of the total length $L_3$ and the outboard portion 145 has a length $L_2$ that represents about 40% of the total length $L_3$.

The first deicing system 153 includes a plurality of spanwise zones 157a-157d. Each spanwise zone 157a-157d extends longitudinally parallel to spanwise axis 131. Each spanwise zone 157a-157d can extend the entire length $L_1$ of the inboard portion 141, 90% of length $L_1$ of the inboard portion 141, or 80% of length $L_1$ of the inboard portion 141. In an exemplary embodiment shown in FIG. 4B, the first deicing system 153 includes four spanwise zones including a first spanwise zone 157a, a second spanwise zone 157b, a third spanwise zone 157c, and a fourth spanwise zone 157d.

Figure 4C:
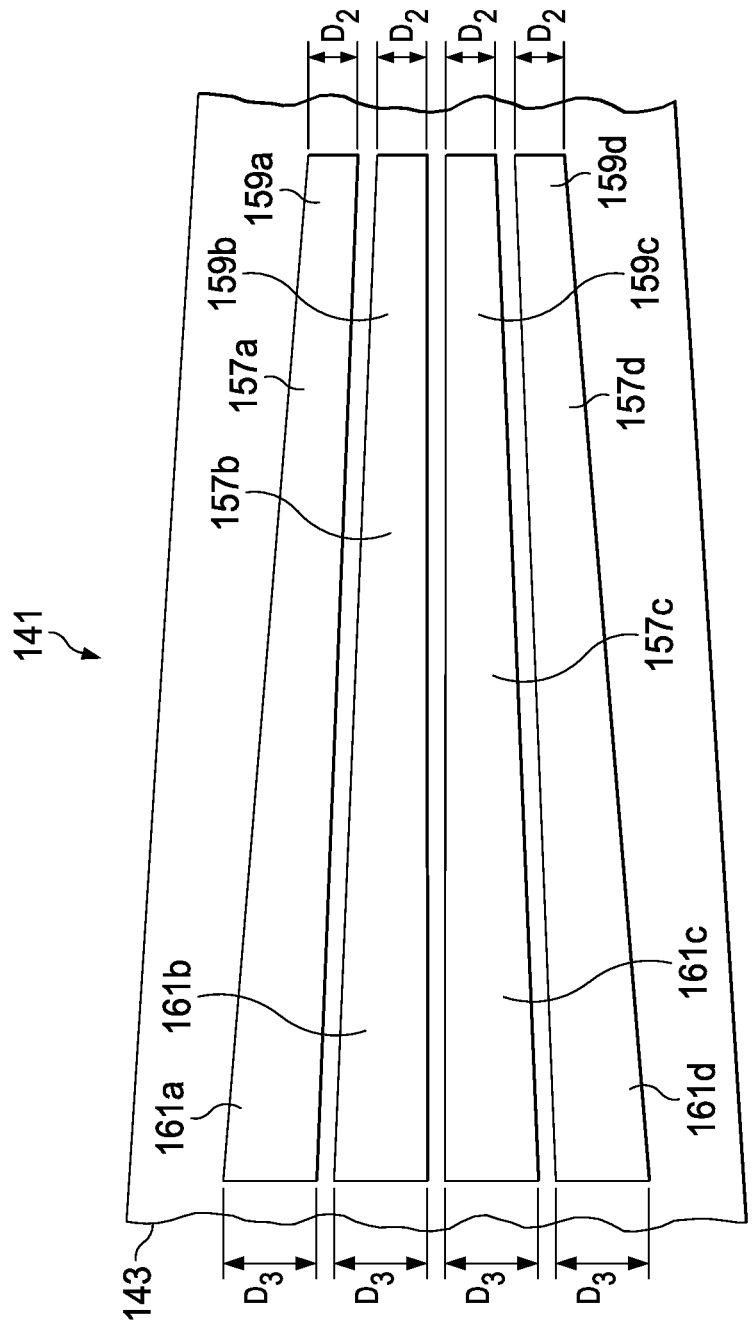
FIGS. 4C and 4D are close-up views of the inboard and outboard portions of the rotor blade in FIG. 4B.
Figure 4D:
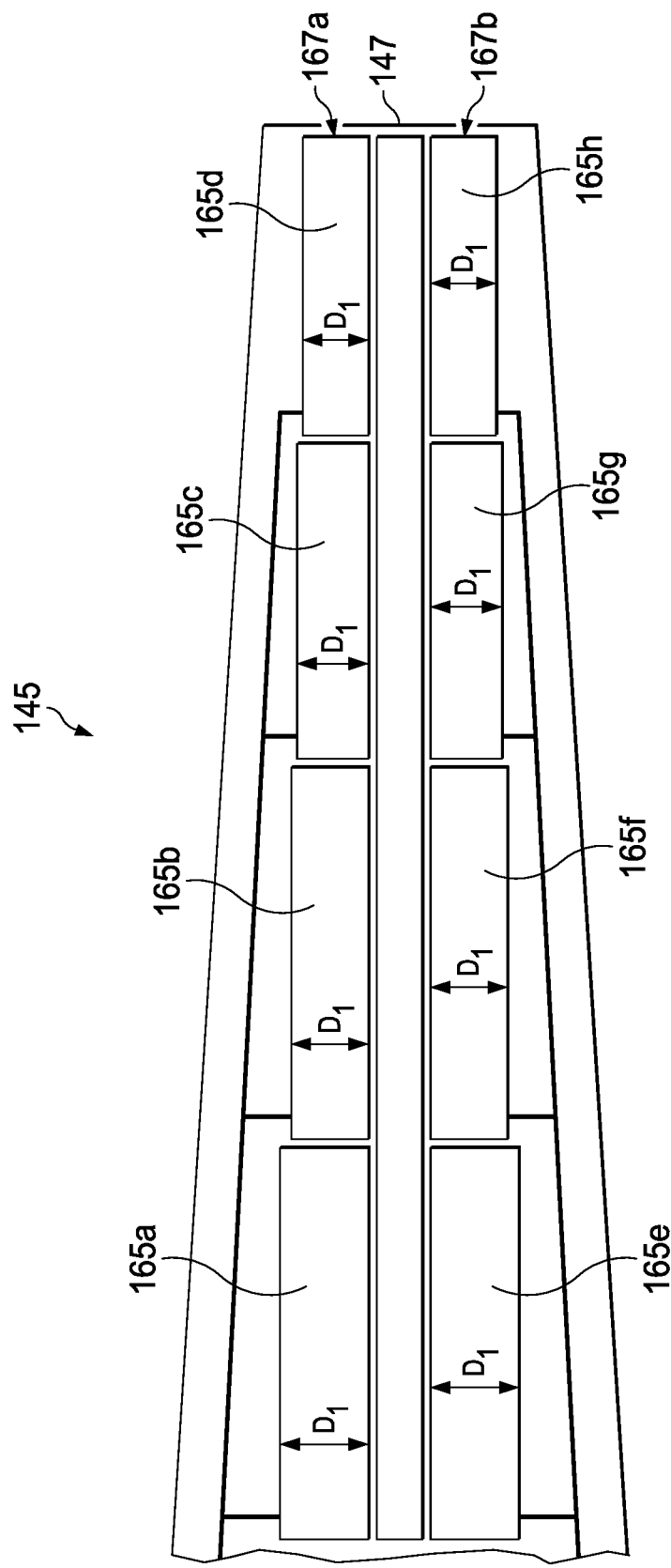

Each spanwise zone 157a-157d extends from the root end 143 of the rotor blade to the second deicing system 155. In a preferred embodiment, each spanwise zone 157a-157d is one piece or one elongated zone (e.g., advantageously separate shorter zones are not included in the inboard portion 141). Each spanwise zone 157a-157d can have a generally elongated trapezoidal shape. In an embodiment, each spanwise zone 157a-157d has taper portion 159a-159d that has a depth $D_2$ that is adjacent to the second deicing system 155 as shown in FIGS. 4C-4D. Each spanwise zone has a base portion 161a-161d adjacent to the root end 143 that is has a depth $D_3$. In an embodiment as shown, the depth $D_3$ of the base portion is more than the depth $D_2$ of the taper portion 159a-159d.

Each of the spanwise zones 157a-157d can be an electrically heated deicing member, a heater blanket or other thermal conductive material configured to warm the rotor blade 130. In an embodiment shown in FIGS. 4B-9, each spanwise zone 157a-157d is a continuous uninterrupted blanket heater that extends longitudinally in the inboard portion 141 and has a generally elongated trapezoidal shape. As shown in FIG. 4B, there are no chordwise parting strips or a chordwise gap disposed between the spanwise zones 157a-157d. In some embodiments, each of the spanwise zones 157a-157d is a spanwise strip. In some embodiments, the spanwise zones 157a-157d are not generally rectangular in shape. The first deicing systems shown in FIGS. 4B-15 include exemplary embodiments of the size, shape, and number of the spanwise zones. It will be appreciated that the length (size), shape, and number of spanwise zones can take on a wide variety of configurations. In an embodiment, the first deicing system 153 can be sold as a replacement kit.

The second deicing system 155 includes a plurality of chordwise zones. Each chordwise zone extends in a chordwise orientation (e.g., at a depth that provides wrap around coverage extending from the leading edge 135 toward the trailing edge 136). The plurality of chordwise zones 165a-165h (e.g., a pair of first chordwise zones 165d, 165h; a pair of second chordwise zones 165c, 165g; a pair of third chordwise zones 165b, 165f; and a pair of fourth chordwise zones 165a, 165e) can extend longitudinally in a series orientation to form an upper chordwise zone row 167a and a lower zone row 167b.

In an embodiment, each chordwise zone 165a-165h has a depth $D_1$ that provides wrap around coverage that is more than a depth of at least a portion of the spanwise zones 157a-157d. In an embodiment, each chordwise zone 165a-165h has a depth $D_1$ to provide wrap around coverage that is more (e.g., deeper and/or extends from the leading edge 135 to the trailing edge 136) than the depth $D_3$ that provides wrap around coverage for the base portion 161a-161d of the spanwise zones 157a-157d. In some embodiments, each chordwise zone 165a-165h has a depth $D_1$ to provide wrap around coverage that is more (e.g., deeper and/or extends from the leading edge 135 to the trailing edge 136) than at least some of the depth $D_2$ that provides wrap around coverage for the taper portion 159a-159d of the spanwise zones 157a-157d.

It will be appreciated that the contemplated embodiments shown herein are exemplary embodiments of the size, shape, and configuration of the second deicing system 155. For example, as shown in FIG. 12, there can be fewer number of chordwise zones depending on the blade configuration and the length of the inboard portion 141 with the first deicing system 153. In other embodiments, there can be more chordwise zones.

An embodiment of the ice protection system 151 and methods therefor includes configuring the length, depth that provides wrap around coverage, and shape of the first and second deicing systems 153, 155 to remove ice in areas on the rotor blade 130 that are at risk for ice accretion. In an embodiment, the first deicing system 153 includes a total of two spanwise zones 157c, 157d. In another embodiment, the first deicing system includes a total of four spanwise zones 157a-157d. The second deicing system 155 includes a total of eight chordwise zones 165a-165h. In an embodiment, the second deicing system 155 includes a total of six chordwise zones 165a-165f. In another embodiment, the second deicing system 155 includes a total of four chordwise zones 165a-165d. In yet another embodiment, the second deicing system 155 includes a total of two chordwise zones 165a, 165b.

Figure 3:
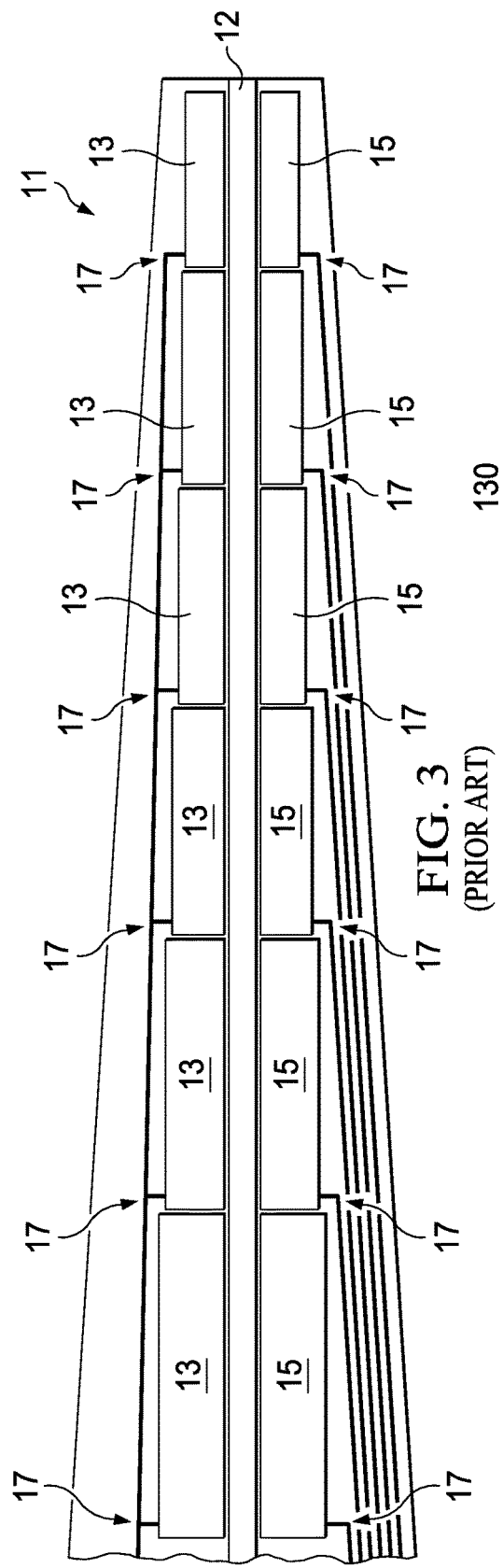
FIG. 3 is a broken-away, unfolded, top view about the leading edge axis of a prior art rotor blade.

The first and second deicing systems 153, 155 are in electrical communication with a power source 169 via a first electrical circuit 171 and a second electrical circuit 173, respectively. In an embodiment, the first and second electrical circuits 171, 173 can be separate. Each of the first and second electrical circuits 171, 173 include electrical busses and electrical connections. The electrical busses in the first and second electrical circuits 171, 173 distribute power from the power source 169 to the spanwise and chordwise zones 157a-157d, 165a-165h, respectively. In an embodiment, first electric circuit 171 includes wires 162a-162d to distribute power from the power source 169 to the spanwise zones 157a-157d, respectively. Electrical connections such as solder joints are included in the first and second electrical circuits 171, 173 to provide and maintain contact between electrical elements with the rotor blade 130. In an embodiment, advantageously the first and second electrical circuits 171, 173 have fewer electrical connections as compared to the prior art ice protection system shown in FIG. 3.

Power source 169 is shown schematically in FIG. 4B. In some embodiments, the power source is an electromechanical slip ring located at the center of the rotor system within the mast that has wires routed to the root end of each blade for power application. A 3-phase power system is preferably used by the primary and secondary electrical circuits 171, 173 and the first and second deicing systems 153, 155.

In an embodiment, the second electrical circuit 173 can advantageously be routed in lower strained areas on the blade 130. In an embodiment, the second electrical circuit 173 is positioned at least partially below a leading edge outer surface, for example, but not limitation, the abrasion strip 195.

The ice protection system 151 can include a controller 127 for selectively controlling the operation of the first and second deicing systems 153, 155. Controller 127 can be disposed in the fuselage 103, as shown in FIG. 1, and is in electrical communication with the power source 169; the first and second electrical circuits 171, 173; and the first and second deicing systems 153, 155.

In an embodiment, the controller 127 can be programed to automatically manage the power to the spanwise and/or chordwise zones. In an embodiment, power to first and second deicing systems 153, 155 are cycled by the controller 127 using a duty cycle. Output signals from OAT sensor 123 and air speed sensor 125 are supplied to controller 127 via cables 175. The controller 127 can include a computer that uses ice management data and/or a lookup table, for example, a preset duty cycle, to ascertain the appropriate duty cycle of heating time for at least one spanwise and/or chordwise zone based on the output signals then applies the duty cycle until a different duty cycle is selected or operation of the spanwise and/or chordwise zones is terminated. It is preferred that the output from the OAT sensor 123 is filtered to prevent the ice protection system 151 from chasing a constantly changing OAT output signal. An exemplary embodiment of a duty cycle can include operating via electrical power a spanwise and/or chordwise zone (e.g., spanwise zones 157a-157d, chordwise zones 165a-165h) for an interval of less than 15 seconds. Using duty cycles to control the operation of the spanwise and/or chordwise zones can advantageously eliminate the need for temperature sensors in the rotor blade, which have a tendency to be unreliable and/or can fail during operation. Accordingly, in an embodiment, the spanwise and/or chordwise zones can advantageously be sensorless.

The controller 127 can be further programmed to alternate the power-on time for a selected spanwise and/or chordwise zone. The location of the activated spanwise and/or chordwise zone can be determined based on at least one of the output signal from the OAT sensor 123, the output signal from the air speed sensor 125, and the configuration of first and second deicing zones 153, 155 on rotor blade 130. The order of the power-on time for the selected spanwise and/or chordwise zones can be programmed to minimize the size of the ice that is shed from the rotor blade 130 leading edge. In an exemplary embodiment, referring to FIG. 4B, the first pair chordwise zones 165d, 165h are heated first; then the second pair of chordwise zones 165c, 165g; then the third pair of chordwise zones 165b, 165f; then the fourth pair of chordwise zones 165a, 165e are heated; then the second deicing system can be heated in the following order, for example, but not limitation, second spanwise zone 157b, followed by third spanwise zone 157c, followed by first spanwise zone 157a, and followed by the fourth spanwise zone 157d. Finally, if needed a heater boot (shown in FIG. 12 as heater boot 160') can be heated to provide ice protection around the rotor blade 130 folding mechanism.

In an embodiment, shown in FIG. 4B, the ice protection system 151 can include an anti-ice zone 177 in the outboard portion 145. Anti-ice zone 177 can be disposed in the leading edge 135 of the outboard portion 145 on the rotor blade 130. Anti-ice zone 177 can include a sensor to monitor external conditions, which can send a signal output to controller 127. The controller can selectively power the anti-ice zone 177 to prevent any ice accumulation thereon. In an embodiment, the anti-ice zone 177 is constantly heated and acts as a parting strip to split the formation of any ice on the upper and lower skins of the rotor blade 130. In one embodiment, the anti-ice zone 177 does not include any sensors (e.g. anti-ice zone 177 is sensorless). The anti-ice zone 177 can be selectively controlled by controller 127 using a duty cycle or other method that prevents ice accumulation thereon.

Figure 13:
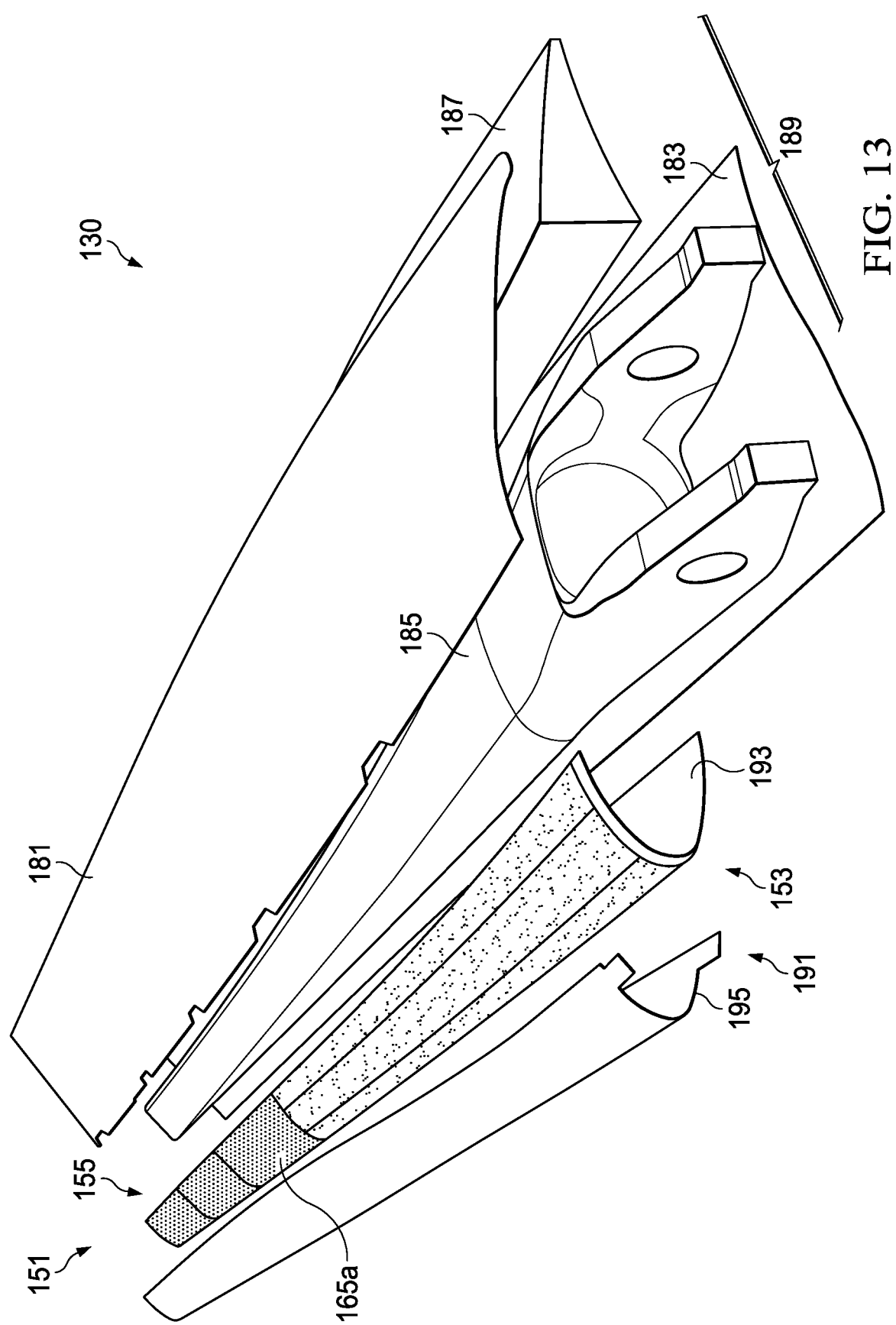
FIG. 13 is an exploded view of a rotor blade, according to an exemplary embodiment.

An exploded view of rotor blade 130 is shown in FIG. 13. Rotor blade 130 can be constructed from an upper skin 181, a lower skin 183, a spar 185, and a trailing edge member 187, which form the aft body 189. The forward body 191 of the rotor blade 130 can include the first and second deicing systems 153, 155 disposed on a leading edge member 193 and an abrasion strip 195. In an embodiment, shown in FIGS. 4B-13, the abrasion strip 195 surrounds the leading edge member 193 with the first and second deicing systems 153, 155 thereon. Abrasion strip 195 can be made of titanium or other suitable material that protects the leading edge 135 of rotor blade 130 from water, sand, rocks, and other debris.

Another embodiment of the ice protection system 151' is shown in FIG. 12. Certain components of ice protection system 151' are as described above in connection with ice protection system 151. Those components bear similar reference characters to the ice protection system 151, but are primed. The second deicing system 155' includes a first pair of chordwise zones 165c', 165f' having a first depth $D_4$ that provides wrap coverage; a second pair of chordwise zones 165b', 165e' having a second depth $D_5$ that provides wrap coverage; and a third pair of chordwise zones 165a', 165d' having a third depth $D_6$ that provides wrap coverage. In an embodiment, the first pair of chordwise zones 165c', 165f' are adjacent to the blade tip 147' of the rotor blade 130. An embodiment provides, that the second and third pairs of chordwise zones 165b', 165e'; 165a', 165d' are outboard of the first pair of chordwise zones 165c', 165f'. The third pair of chordwise zones 165a', 165d' can be inboard of the second pair of chordwise zones 165b', 165e. In an embodiment, at least one of the depths $D_5$ and $D_6$ of the second and third pairs of chordwise zones 165b', 165e'; 165a', 165d' are less than the depth $D_4$ of the first pair of chordwise zones 165c', 165f'. In another embodiment, the depth $D_5$ of the second pair of chordwise zones 165b', 165e' is more than the depth $D_6$ of the third pair of chordwise zones 165a', 165d'. In embodiment, the plurality of chordwise zones has varying widths such that the most outboard chordwise zones 165f', 165c' have a depth providing wrap around coverage more than at least one inboard chordwise zones 165a', 165b', 165d', 165e'. Advantageously, the second electrical circuit 173' for the second deicing system 155' allows the bus bars to be positioned more compactly as compared to chordwise zones having a uniform depth or substantially similar depth.

In an embodiment, the bus bars can be routed below the spanwise zones 157a'-157d' rather than outside thereof.

Ice protection system 151' further includes a heater boot 160' that is disposed on the root end 143' of the rotor blade 130'. In some embodiments, the heater boot 160' can provide ice protection around the blade folding mechanism and is independent of the first deicing system 151'.

As shown in FIGS. 4B-13, the first and second deicing systems 153, 155 and 153', 155' are at least partially disposed below (e.g., at least partially underneath and/or beneath) the abrasion strip 195.

FIGS. 14-15 illustrate another example embodiment of an ice protection system 251. Certain components of the ice protection system 251 are as described above. Those components bear similar reference characters, but with a leading '2' rather than a leading '1'. Rotor blade 230 includes abrasion strip 295. The first deicing system 253 is disposed externally and on the abrasion strip 295. Advantageously, the externally mounted first deicing system 253 facilitates the assembly onto the abrasion strip 295 and replacement thereon.

An embodiment provides that the second deicing system 255 is disposed at least partially below the abrasion strip 295. In an embodiment, the second deicing system 255 can be disposed on the leading edge member. Advantageously the second electrical circuit 273 can be positioned below the abrasion strip 295 where there is less strain and no interference with the first deicing system 253 as shown in FIG. 14.

In an embodiment, there is provided a method to de-ice a rotor blade of an aircraft including providing a rotor blade susceptible to an ice buildup having an inboard portion and an outboard portion, providing a first deicing system coupled only to the inboard portion of the rotor blade, the first deicing system comprising a plurality of spanwise zones; providing a second deicing system coupled only to the outboard portion of the rotor blade, the second deicing system comprising a plurality of chordwise zones; operating the first deicing system to heat the inboard portion of the rotor blade; and operating the second deicing system to heat the outboard portion of the rotor blade.

In some embodiments, the step of operating the second deicing system is performed before operating the first deicing system step.

In another embodiment, the method includes sensing an air temperature near a fuselage of the aircraft and a velocity of air passing over the fuselage of the aircraft; and selectively controlling the operation of the first deicing system and the second deicing system. The controlling the operation step can further include selecting a duty cycle. The duty cycle can be defined by a pattern of time intervals in which electrical power is supplied or not supplied to the first and second deicing systems for the duration of each time interval within the pattern, the selection of the duty cycle being at least partially in response to the sensed air temperature near the fuselage and the velocity of air passing over the fuselage of the aircraft.

The illustrative embodiments of the ice protection system described herein advantageously provide at least one of the following benefits: (1) ice detection sensors are not required by the first and second deicing systems, which improves the reliability of the embodiments disclosed herein as compared to conventional ice management systems that use ice detection sensors; (2) the ice protection system can reduce the number of deice zones, electrical connections, and crossover wires while not exceeding the aircraft power budget; (3) improved reliability because the electrical circuits can be extended down the span of the blade since the first deicing system can be positioned on the abrasion strip; and (4) the externally mounted first deicing system takes up less internal space in the blade and can permit ease of removal and replacement thereof.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The terms "a" and "an" are defined as one or more unless this disclosure explicitly requires otherwise.

The terms "substantially" and "generally" are defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," "generally," and "about" may be substituted with "within [a percentage] of" what is specified, where the percentage includes 0.1, 1, and 5 percent.

Terms such as "first" and "second" are used only to differentiate features and not to limit the different features to a particular order or to a particular quantity.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. An ice protection system for a rotary aircraft, comprising:
   a rotor blade susceptible to an ice buildup having an inboard portion and an outboard portion, the length of the inboard portion and the length of the outboard portion define a total length of the rotor blade, the length of the inboard portion of the rotor blade is from 40% to 60% of the total length of the rotor blade, the rotor blade including a spanwise axis, a leading edge, and trailing edge;
   a first deicing system coupled only to the inboard portion of the rotor blade, the first deicing system comprising a plurality of spanwise zones, each of the spanwise zones extending longitudinally parallel to the spanwise axis and having a length of at least 90% of the length of the inboard portion; and
   a second deicing system coupled only to the outboard portion of the rotor blade, the second deicing system comprising a plurality of chordwise zones, the plurality of chordwise zones comprises a first chordwise zone adjacent to a tip of the rotor blade and a second chordwise zone inboard of the first chordwise zone; wherein the depth of the first chordwise zone is more than the depth of the second chordwise zone.

2. The ice protection system according to claim 1, wherein the rotor blade comprises an abrasion strip disposed on a leading edge thereof, at least one of the first deicing system and the second deicing system is disposed at least partially below the abrasion strip.

3. The ice protection system according to claim 2, wherein the first deicing system is disposed on the abrasion strip.

4. The ice protection system according to claim 3, wherein the second deicing system is disposed at least partially below the abrasion strip.

5. The ice protection system of claim 1, wherein the rotor blade is for a tiltrotor aircraft.

6. The ice protection system according to claim 1, further comprising an anti-ice zone in the outboard portion.

7. The ice protection system according to claim 6, wherein at least one of the first deicing system, the second deicing systems, and the anti-ice zone is sensor-less.

8. The ice protection system according to claim 1, further comprising a controller for selectively controlling the operation of the first deicing system and the second deicing system.

9. The ice protection system according to claim 8, wherein the controller is configured to operate according to a duty cycle.

10. A deicing system for a rotary aircraft, comprising:
    a plurality of spanwise zones configured to be coupled only to an inboard portion of a rotor blade, the rotor blade including a spanwise axis, a leading edge, and trailing edge; and
    a plurality of chordwise zones configured to be coupled only to an outboard portion of a rotor blade, the plurality of chordwise zones comprises a first chordwise zone adjacent to a tip of the rotor blade and a second chordwise zone inboard of the first chordwise zone, wherein the depth of the first chordwise zone is more than the depth of the second chordwise zone;
    wherein the inboard portion of the rotor blade is from 40% to 60% of the total length of the rotor blade;
    wherein each of the spanwise zones extending longitudinally parallel to the spanwise axis and having a length of at least 90% of the length of the inboard portion.

11. The deicing system of claim 10, wherein each of the spanwise zones has a generally trapezoidal shape.

12. A method to de-ice a rotor blade of an aircraft, comprising:
    providing a rotor blade susceptible to an ice buildup having an inboard portion and an outboard portion, the length of the inboard portion and the length of the outboard portion define a total length of the rotor blade, the length of the inboard portion of the rotor blade is from 40% to 60% of the total length of the rotor blade, the rotor blade including a spanwise axis, a leading edge, and trailing edge;

providing a first deicing system coupled only to the inboard portion of the rotor blade, the first deicing system comprising a plurality of spanwise zones, each of the spanwise zones extending longitudinally parallel to the spanwise axis and having a length of at least 90% of the length of the inboard portion;

providing a second deicing system coupled only to the outboard portion of the rotor blade, the second deicing system comprising a plurality of chordwise zones, the plurality of chordwise zones comprises a first chordwise zone adjacent to a tip of the rotor blade and a second chordwise zone inboard of the first chordwise zone; wherein the depth of the first chordwise zone is more than the depth of the second chordwise zone;

operating the first deicing system to heat the inboard portion of the rotor blade; and operating the second deicing system to heat the outboard portion of the rotor blade.

13. The method according to claim 12, wherein the operating the second deicing system step is performed before the operating the first deicing system step.

14. The method according to claim 12, wherein the first deicing system is coupled only to the inboard portion of the rotor blade and the second deicing system is coupled only to the outboard portion of the rotor blade.

15. The method according to claim 12, further comprising:

sensing an air temperature near a fuselage of the aircraft and a velocity of air passing over the fuselage of the aircraft; and selectively controlling the operation of the first deicing system and the second deicing system.

16. The method according to claim 15, wherein the controlling the operation step further comprises selecting a duty cycle.

17. The method according to claim 16, wherein the duty cycle is defined by a pattern of time intervals in which electrical power is supplied or not supplied to the first deicing system and the second deicing system for the duration of each time interval within the pattern, the selection of the duty cycle being at least partially in response to the sensed air temperature near the fuselage and the velocity of air passing over the fuselage of the aircraft.

* * * * *